United States Patent

Oizumi et al.

[11] Patent Number: 5,230,256
[45] Date of Patent: Jul. 27, 1993

[54] AUTOMATIC TRANSMISSION CONTROL SYSTEM WITH DUAL THROTTLES

[75] Inventors: Yutaka Oizumi, Higashihiroshima; Shinji Shimaoka; Masatoshi Kojima, both of Hiroshima, all of Japan

[73] Assignee: Mazda Motor Corporation, Hiroshima, Japan

[21] Appl. No.: 859,567

[22] Filed: Mar. 27, 1992

[30] Foreign Application Priority Data

Mar. 27, 1991 [JP] Japan ................. 3-063483

[51] Int. Cl.⁵ ................. F16H 61/04; B60K 41/06
[52] U.S. Cl. .................... 74/866; 364/424.1
[58] Field of Search ............. 74/866; 364/424.1

[56] References Cited

U.S. PATENT DOCUMENTS

| | | | |
|---|---|---|---|
| 4,353,272 | 10/1982 | Schneider et al. | 74/866 X |
| 4,523,281 | 6/1985 | Noda et al. | 74/866 X |
| 4,589,302 | 5/1986 | Oda et al. | 74/866 |
| 4,669,335 | 6/1987 | Matsuoka et al. | 74/866 |
| 4,720,792 | 1/1988 | Kasai et al. | 74/866 X |
| 4,996,893 | 3/1991 | Nakamura et al. | 74/866 |
| 5,018,408 | 5/1991 | Bota et al. | 74/866 |
| 5,076,116 | 12/1991 | Sasaki | 74/866 |
| 5,101,687 | 4/1992 | Iwatsuki et al. | 74/866 X |

FOREIGN PATENT DOCUMENTS 2-221658 9/1990 Japan.

Primary Examiner—Richard M. Lorence
Assistant Examiner—Khoi Q. Ta
Attorney, Agent, or Firm—Keck, Mahin & Cate

[57] ABSTRACT

An automatic transmission shift control system shifts an automatic transmission according to openings of mechanical throttle valve when a predetermined high speed shift pattern for a power mode of engine operation is either manually or automatically selected and according to openings of an electric throttle valve when a predetermined low speed shift pattern for an economic mode of engine operation is either manually or automatically selected.

10 Claims, 6 Drawing Sheets

AUTOMATIC TRANSMISSION CONTROL SYSTEM WITH DUAL THROTTLES

BACKGROUND OF THE INVENTION

1. Field of the Invention

This invention relates to an automatic transmission control system in which shift control is accomplished on the basis of shift characteristics according to vehicle speed.

2. Description of Related Art

Some automobile engines are provided with an electric throttle valve, which is operated by an electric motor, in addition to a mechanical throttle valve, which opens and closes in response to movements of the accelerator pedal. Since the electric throttle valve is controlled to show more tendency toward closing, the engine output is virtually controlled by the electric throttle valve. Such an automobile engine is known from, for instance, Japanese patent application No. 1-44,013, entitled "Throttle Opening Control System Of Engine Intake System," filed on Feb. 23, 1989 and now opened as Japanese Unexamined Patent Publication No. 2-221,658 on Aug. 4, 1990.

Automatic transmissions for use with this kind of engine are typically controlled on the basis of shift patterns, such as shown in FIG. 1, according to throttle opening and vehicle speed. With most of such automatic transmissions, although attempts are made at establishing optimal shift patterns for the most efficient fuel consumption corresponding to engine output, it is difficult to establish shift patterns that satisfactorily meet all requirements due to the fact that the opening of an electric throttle valve, with which actual engine output is controlled, will vary depending upon various driving conditions as is shown by the shaded area in FIG. 2.

SUMMARY OF THE INVENTION

The present invention has as an object the provision of an automatic transmission control system for performing shift control of an automatic transmission cooperating with an engine suitably for driving conditions corresponding to selected transmission shift patterns or characteristics.

An automatic transmission shift control system of this invention is endowed with a shift pattern selection means which selects a high speed shift pattern for a power drive mode and a low speed shift pattern for an economy drive mode. It controls the automatic transmission to shift according, on one hand, to movements of an accelerator pedal when the shift pattern selection means selects the high speed shift pattern and, on the other hand, to engine outputs when the shift pattern selection means selects the low speed shift pattern.

More specifically, an automatic transmission, controlled to shift by the automatic transmission shift control system of this invention, cooperates with an engine which has a primary, mechanical throttle valve opening in response to operated strokes of a mechanically linked accelerator pedal, and a secondary, electrically operated throttle valve for controlling the amount of intake air which passes through the primary, mechanical throttle valve, both of the throttle valves being disposed in an intake system connected to the engine. With this automatic transmission control system, when a selection is made for the high speed shift pattern, the shift control of the automatic transmission is accomplished according to openings of the primary, mechanical throttle valve. On the other hand, when a selection is made for the low speed shift pattern, the shift control of the automatic transmission is accomplished according to openings of the secondary, electrically operated throttle valve.

Selection of the high speed and low speed shift patterns can be made either manually or automatically. For example, a manually operated mode selection switch is used to make manual selection of the power drive mode and the economy drive mode. Alternatively, in order to make automatic selection of the power drive mode and the economy drive mode, a throttle opening sensor is used to detect an opening of the primary, mechanical throttle valve. The shift pattern selection means is adapted to automatically select the power mode for the high speed shift pattern when the throttle opening sensor detects a change rate in opening of the primary, mechanical throttle valve higher than a predetermined change rate and the economy mode for the low speed shift pattern when it detects change rates in opening of the primary, mechanical throttle valve lower than the predetermined change rate.

BRIEF DESCRIPTION OF THE DRAWINGS

The above and other objects and features of the present invention will be apparent to those skilled in the art from the following description of preferred embodiments thereof when considering in conjunction with the accompanying drawings, in which.

DETAILED DESCRIPTION OF THE PREFERRED EMBODIMENT

Figure 1:
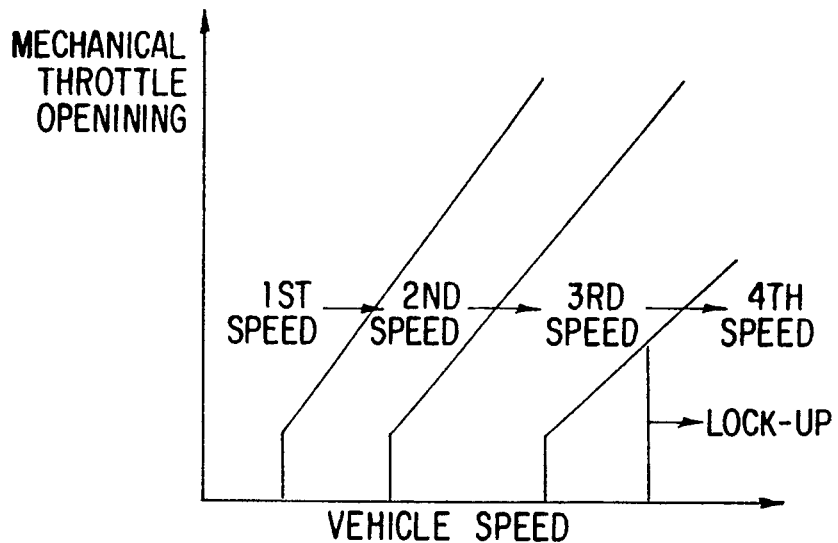
FIG. 1 is a diagram showing a shift pattern of a conventional automatic transmission in terms of mechanical throttle valve opening and vehicle speed.
Figure 2:
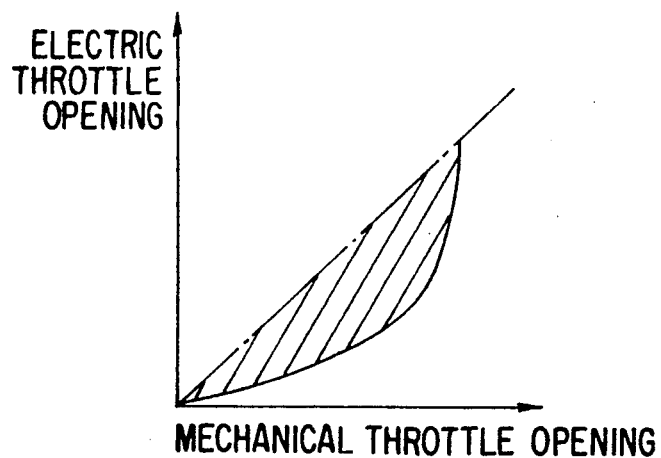
FIG. 2 is a diagram showing electric throttle valve opening with respect to mechanical throttle valve opening for given vehicle speed in the prior art.
Figure 3:
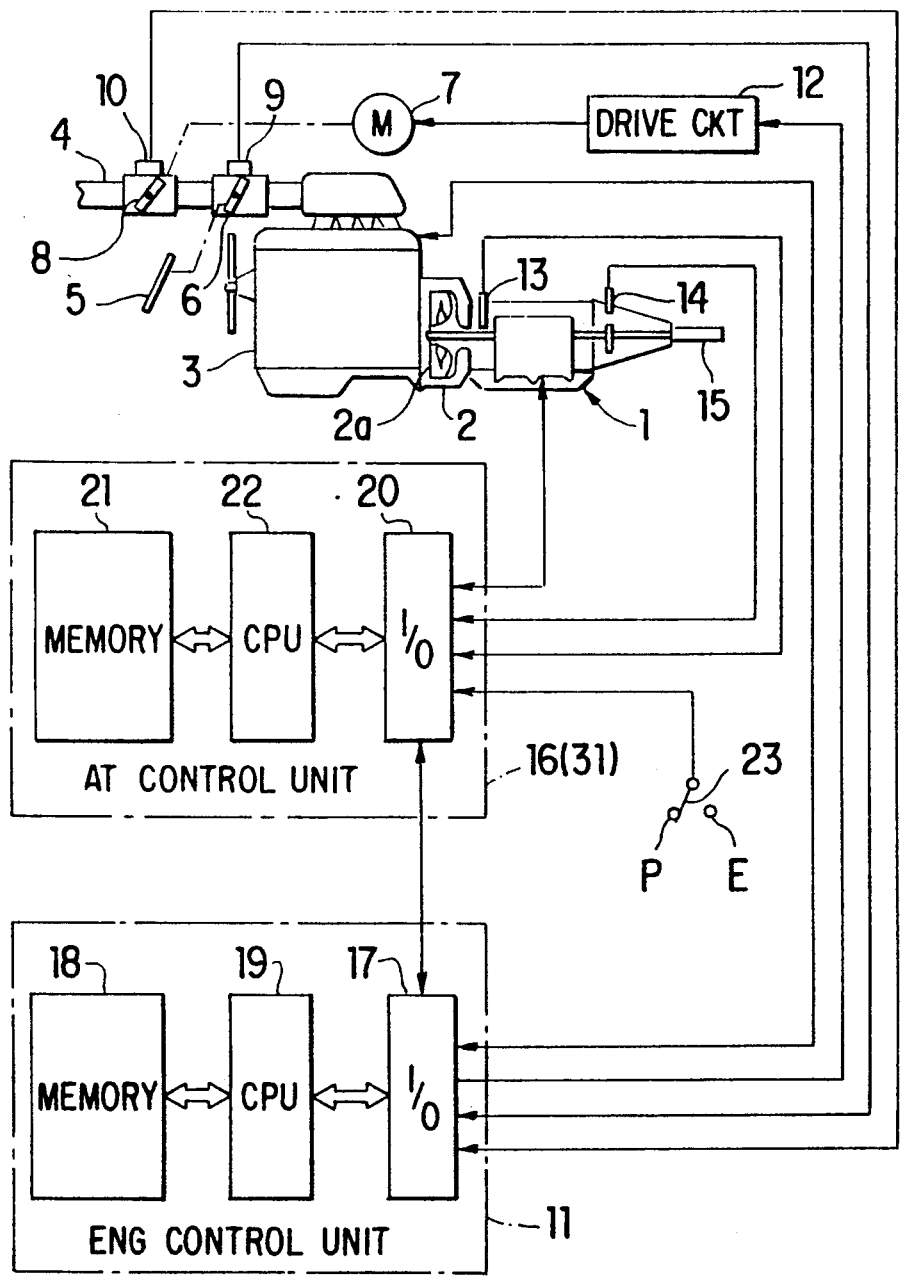
FIG. 3 is a schematic diagram showing an engine with an automatic transmission controlled by a shift control system in accordance with a preferred embodiment of the present invention.

Referring to the drawings in detail, and, in particular, to FIG. 3, an internal combustion engine 3 equipped with an automatic transmission 1 which is controlled by an automatic transmission control system in accordance with a preferred embodiment of the present invention is shown. The automatic transmission 1 has a hydraulic torque converter 2. The engine 3 is connected with an air intake pipe 4 having a primary throttle valve, such as a mechanical throttle valve 6, and a secondary throttle valve, such as an electric throttle valve 8 disposed upstream of the mechanical throttle valve 6. The mechanical throttle valve 6 opens and closes in response to operational movements of an accelerator pedal 5. The electric throttle valve 8 is driven by means of a throttle control motor 7 which is driven or operated by means of a drive circuit 12. Throttle sensors 9 and 10, which detect throttle opening, are, respectively, attached to the mechanical throttle valve 6 and the electric throttle valve 8. Output signals of the throttle sensors 9 and 10, representative of throttle opening, are sent to an engine control unit (ENG control unit) 11.

Automatic transmission 1 is provided with a turbine speed sensor 13 and a vehicle speed sensor 14. The turbine speed sensor 13 generates an output signal, consisting of a number of pulses proportional to a rotational speed of a turbine 2a of the torque converter 2. The vehicle speed sensor 14 generates an output signal, consisting of a number of pulses proportional to the rotational speed of an output shaft 15 of the automatic transmission 1. The output signals of the turbine speed sensor 13 and the vehicle speed sensor 14, which respectively reflect the number of rotations of the turbine 2a and the output shaft 15, are sent to an automatic transmission control unit (AT control unit) 16. Engine control unit 11, which is endowed with an input/output (I/O) device 17, a memory component 18, and a central processing unit (CPU) 19, controls the operation of the engine 3. The I/O device 17 is an interface which controls input and output between central processing unit (CPU) 19, the throttle sensors 9 and 10, the motor drive circuit 12, and various components of the engine 3, such as ignition devices, (not shown). The memory component 18 is composed of a read only memory (ROM) and a random access memory (RAM), in which reside recorded maps or programs to control the operation of the engine 3, including the temporary recording of results calculated at the time of control implementation.

Central processing unit (CPU) 19 handles data communication with the memory 18 in order to perform various calculations and also handles data communication with the automatic transmission control unit (AT control unit) 16 for the requisite control of engine 3. For example, the central processing unit 19 recognizes an opening of the mechanical throttle valve 6 from a signal received from the throttle sensor 9, and interprets it as an operational movement of the accelerator pedal 5, which is used as a control parameter for the engine 3 and is transmitted to the automatic transmission control unit 16. In addition, the central processing unit (CPU) 19 recognizes an opening of the electric throttle valve 8 from a signal received from the throttle sensor 10, and interprets it as an engine output. This is then incorporated within the control parameters for the engine 3, which is also used as an engine control and transmitted to the automatic control unit 16.

Figure 4:
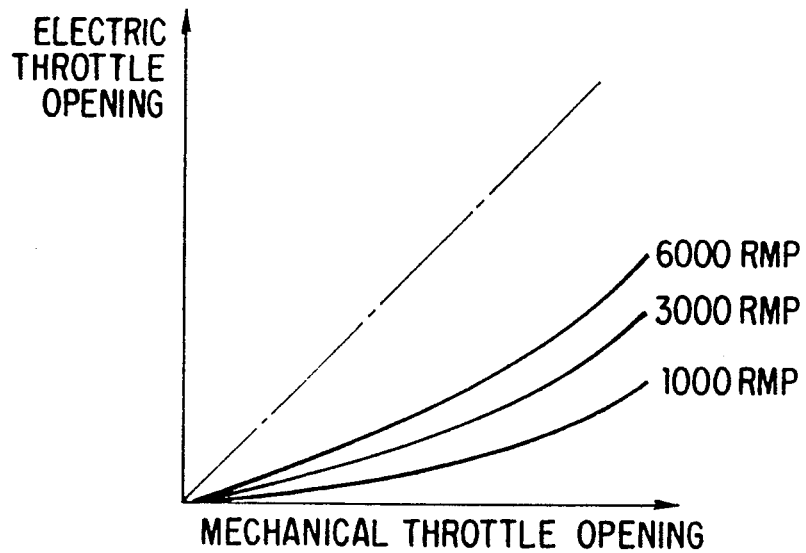
FIG. 4 is a diagram showing electric throttle valve opening with respect to mechanical throttle valve opening for given vehicle speeds.

In order to stabilize the output of the engine 3, the central processing unit (CPU) 19 controls the opening of the electric throttle valve 8 on the basis of several factors, including a shift range, engine speed and mechanical throttle valve opening, as shown in FIG. 4 in which control curves represent openings of the electric throttle valve 8 for three different engine speeds. Generally, by changing the opening of electric throttle valve 8 linearly, a large amount of torque is available when the opening of the electric throttle valve 8, is small. On the other hand, when the opening of the electric throttle valve 8 is large, the engine 3 has more tendency not to increase its output. Therefore, the electric throttle valve 8 is controlled rather to close when its opening is small and rather to open when its opening is larger. In addition, in order to keep the engine from hunting due, for example, to shifting the transmission to a second speed gear after accelerating in a first speed gear, the electric throttle valve 8 is controlled rather to close when the transmission is in the first speed gear and to open rather large when the transmission is in the second speed gear.

Figure 5:
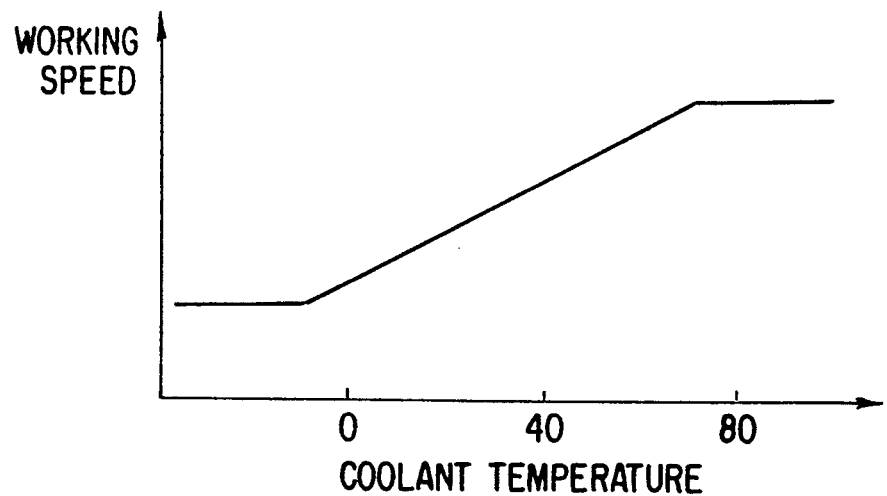
FIG. 5 is a diagram showing operational rate of the electric throttle valve relative to engine coolant temperature.

As is shown in FIG. 5, the central processing unit (CPU) 19 controls the electric throttle valve 8 so as to lower or decrease the working speed of the electric throttle valve 8, namely, the changing rate of opening of the electric throttle valve 8 per unit time, when the temperature of engine coolant is less than 0 degrees centigrade, to enlarge or increase the working speed gradually as the engine coolant temperature becomes elevated, and to keep it at a constant speed when the engine coolant temperature reaches approximately 80 degrees centigrade. With such control, when the engine 3 is still cold and consequently unresponsive, the electric throttle valve 8 is controlled rather to close so as to restrict the amount of intake air. As the engine 3 warms up, the electric throttle valve 8 gradually opens so as to increase the amount of intake air, thereby maintaining the amount of intake air at the most appropriate level for engine temperature. For this purpose, a thermometer or engine coolant temperature sensor (not shown) is connected to the central processing unit (CPU) 19 through I/O device 17.

Automatic transmission (AT) control unit 16, which is composed of an I/O device 20, a memory 21 and a central processing unit (CPU) 22, collectively controls the operation of the automatic transmission 1. The I/O device 20 is an interface between the central processing unit (CPU) 22, a manual switch 23 which is attached to a shift lever (not shown), the turbine speed sensor 13 and the vehicle speed sensor 14. The memory 21, which is composed of a read only memory (ROM) and a random access memory (RAM), stores programs necessary for the control of the automatic transmission 1 and, also, temporarily stores resulting data of calculations performed upon control. The memory 21 also stores high speed shift schedules and low speed shift schedules in a form of separate maps. The high speed shift schedules are given as a shift pattern designed for a power mode, which is one shift mode of the transmission, wherein the responsibility of the engine 3 is increased. The low speed shift schedules are given as a shift pattern designed for an economy mode, which is another shift mode of the transmission, wherein the most ideal fuel efficiency corresponding to an engine output of the engine 3 is obtained. These two modes, namely the power mode (P) and the economy mode (E), are selected by the manual switch 23.

Figure 6:
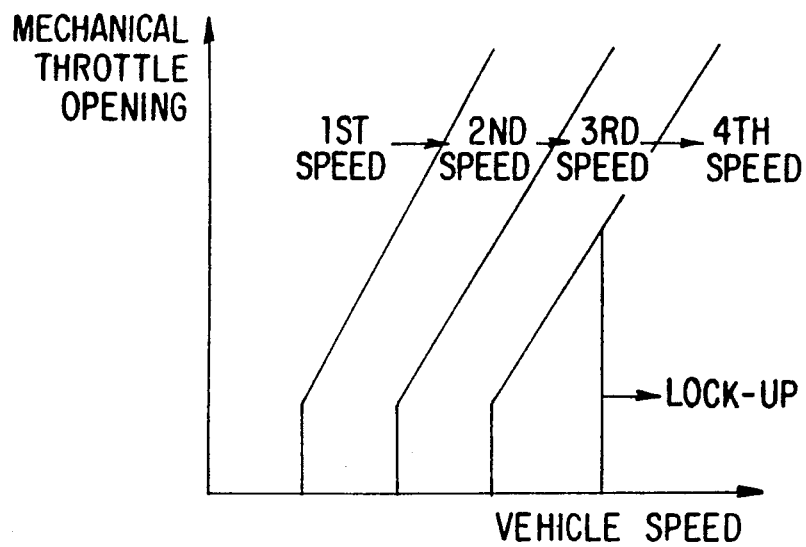
FIG. 6 is a diagram showing a shift pattern of the automatic transmission for a power mode in terms of mechanical throttle valve opening and vehicle speed.
Figure 7:
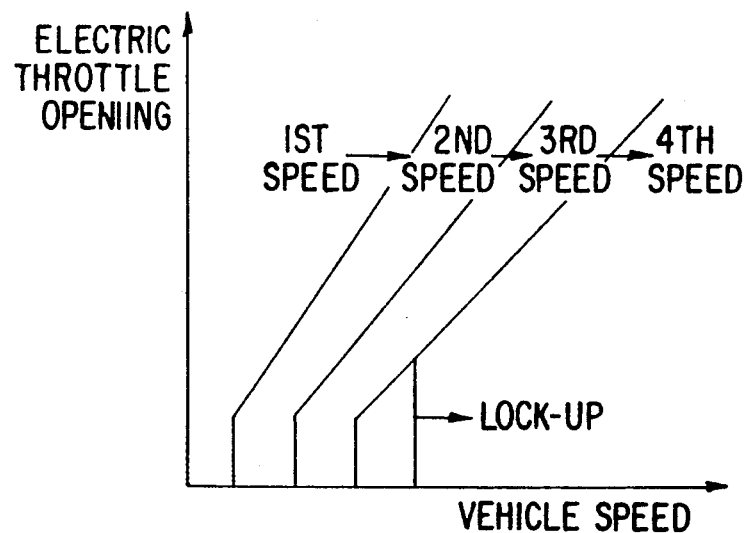
FIG. 7 is a diagram showing a shift pattern of the automatic transmission for an economy mode in terms of electric throttle valve opening and vehicle speed.

Central processing unit (CPU) 22 controls shift solenoids (not shown) within the automatic transmission 1 so as to shift the automatic transmission 1 according to a shift pattern corresponding to openings of the mechanical throttle valve 6 when the power mode is selected by the manual switch 23. On the other hand, when the economy mode is selected, the CPU controls the shift solenoids so as to shift the automatic transmission 1 according to a shift pattern corresponding to openings of the electric throttle valve 8. The shift pattern for the power mode is, as shown in FIG. 6, established in terms of vehicle speed and mechanical throttle valve opening. Similarly, the shift pattern for the economy mode is, as shown in FIG. 7, established in terms of vehicle speed and electric throttle valve opening. In these shift patterns, a shift timing of the shift pattern for the power mode is set on the side of higher vehicle speeds compared to a shift timing of the shift pattern for the economy mode.

Automatic transmission (AT) control unit 16 thus constructed performs shift control of the automatic transmission 1, on one hand, on the basis of an operational movement of the accelerator pedal 5, i.e. an opening of the mechanical throttle valve 6, when a selection of the high speed shift pattern is made, and, on the other hand, on the basis of an output of the engine 3, i.e. an opening of the electric throttle valve 8, when a selection of the low speed shift pattern is made. In such a way, the automatic transmission (AT) control unit 16 functions as both a shift control means and a throttle valve opening responding shift control means.

Figure 8:
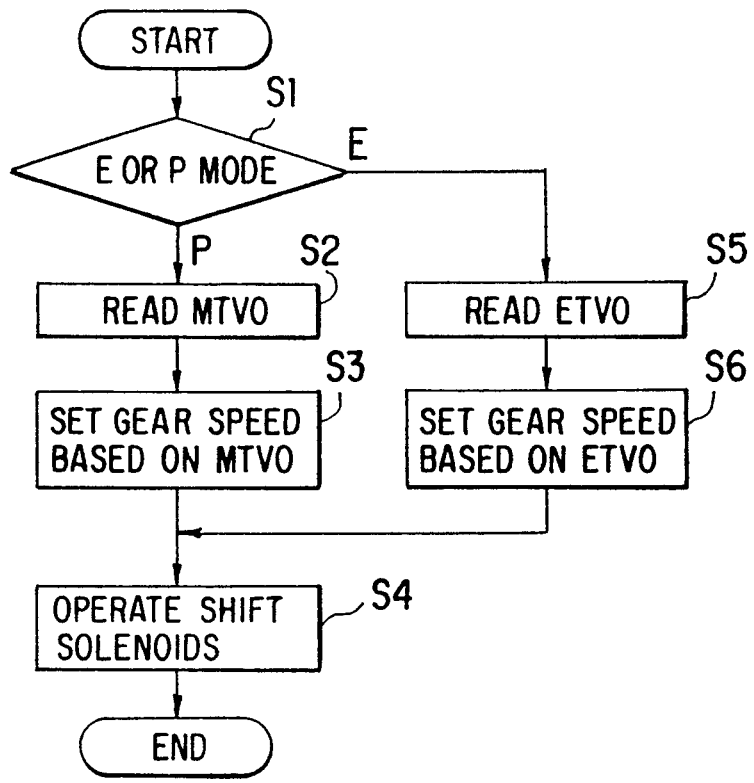
FIG. 8 is a flow chart illustrating a shift control sequence for a microcomputer of an automatic transmission control unit.
Figure 9:
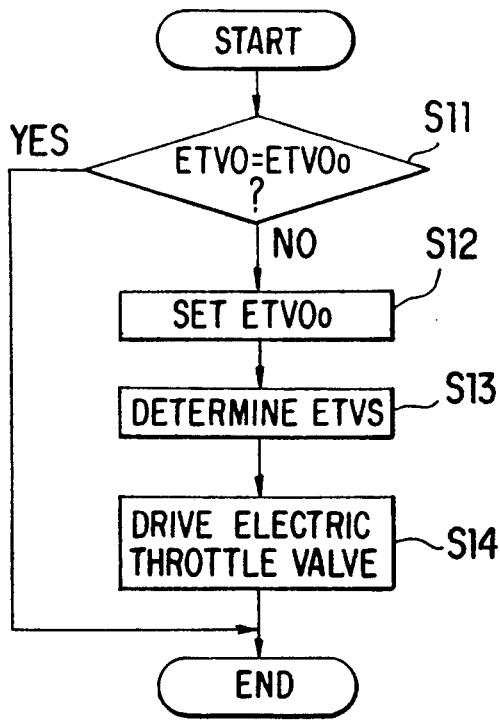
FIG. 9 is a flow chart illustrating a valve opening control sequence for the electric throttle valve for the microcomputer of the automatic transmission control unit.

The operation of the automatic transmission control system depicted in FIG. 3 is best understood with reference to FIGS. 8 and 9, which are flow charts illustrating a transmission shift control routine or sequence and an electric throttle valve control routine or sequence, respectively, for the central processing units (CPU) 22 of the automatic transmission (AT) control unit 16 and the central processing units (CPU) 19 of the engine (ENG) control unit 16, respectively. Programming a computer is a skill well understood in the art. The following description is written to enable a programmer having ordinary skill in the art to prepare an appropriate program for the central processing unit (CPU) 22. The particular details of any such program would, of course, depend upon the architecture of the particular computer selected.

Referring to FIG. 8, the first step at step S1 is to determine whether a shift mode selected by means of the manual switch 23 is the power (P) mode or the economy (E) mode. If a determination is made in favor of the power mode (P), an opening MTVO of the mechanical throttle valve 6 is read from the throttle sensor 9 and stored temporarily in the memory 21 at step S2. Thereafter, a speed gear to which the automatic transmission 3 is shifted is selected corresponding to the opening MTVO following the shift pattern for the power mode at step S3 and then, appropriate shift solenoids are actuated so as to shift the automatic transmission 1 to the speed gear at step S4.

Alternatively, if a decision is made in favor of the economy (E) mode at step S1, an opening ETVO of the electric throttle valve 8 is read from the throttle sensor 10 and stored temporarily in the memory 21 at step S5. The central processing unit (CPU) 22 then follows the shift pattern for the economy mode to select a speed gear corresponding to the opening ETVO, at step S6 and then actuates appropriate shift solenoids so as to shift the automatic transmission 1 to the speed gear at step S4, at which the speed shift control is accomplished.

Referring to FIG. 9, which is a flow chart illustrating the electric throttle valve control routine performed by means of the engine (ENG) control unit 11, a decision is made at step S11 whether or not an opening ETVO of the electric throttle valve 8 is equivalent to a target or desired opening. If the answer to the decision is "NO", then a target or desired opening (ETVOo) for the electric throttle valve 8 is determined on the basis of several factors, including a current speed gear of the automatic transmission 1, a current engine speed in revolutions of the engine 3, and a current opening of the mechanical throttle valve 6 at step S12. Thereafter, an operational speed or rate (ETVS) of the electric throttle valve 8 is determined on the basis of the temperature of the engine coolant of the engine 3 at step 13. According to the target or desired opening (ETVOo) for the electric throttle valve 8 and the operational speed (ETVS) of the electric throttle valve 8 thus determined, the drive circuit 12 is controlled to provide an appropriate voltage output to the throttle motor 7 so as to cause the throttle motor 7 to open the electric throttle valve 8 to the target or desired opening (ETVOo) at the operational rate (ETVS) at step S14. Alternatively, if the answer to the decision at step S11 is "YES," this indicates that the electric throttle valve 8 opening is equal to the target opening. Then, the engine 3 continues to operate with the actual opening of the electric throttle valve 8.

As indicated, since, when selecting the power (P) mode, the automatic transmission 1 is controlled to shift itself according to an opening of the mechanical throttle valve 6 which changes linearly in proportion to the amount of movement of the accelerator pedal 5, a high level of responsibility of the automatic transmission 1 is facilitated when accelerating rapidly. In addition, when selecting the economy (E) mode, the automatic transmission 1 is controlled to shift itself according to an opening of the electric throttle valve 8 which corresponds to an actual output of the engine 3. Therefore, the most appropriate fuel economy is obtained corresponding to the output of the engine 3.

Figure 10:
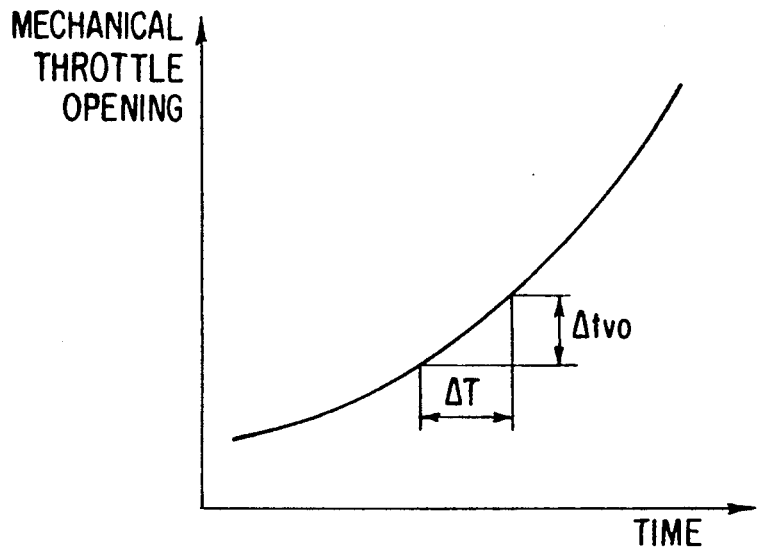
FIG. 10 is a diagram showing mechanical throttle valve opening relative to time.
Figure 11:
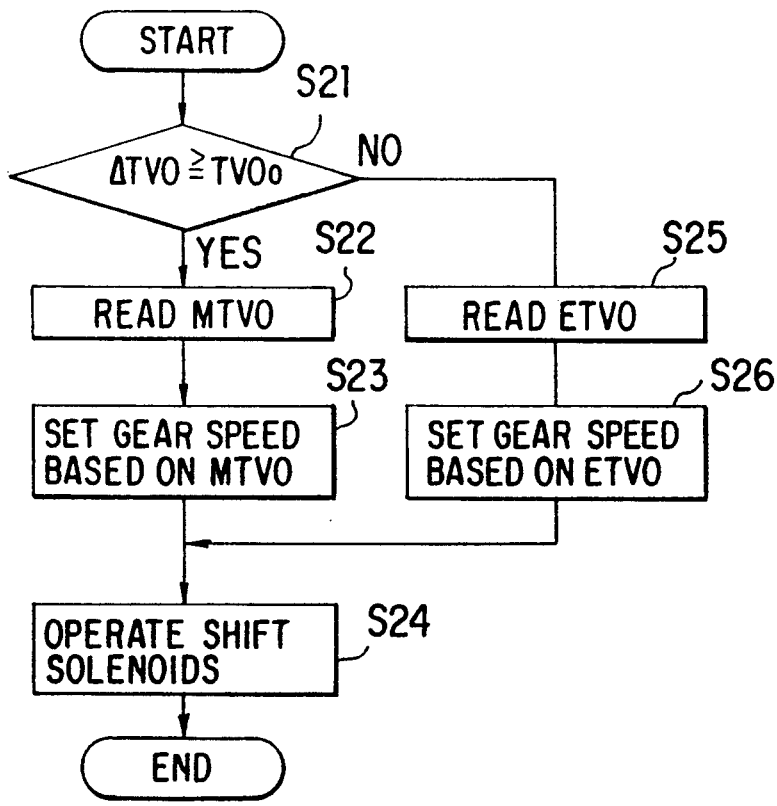
FIG. 11 is a flow chart illustrating a shift control sequence for an automatic transmission for a microcomputer of an automatic transmission control unit in accordance with another preferred embodiment of the present invention.

Referring to FIGS. 10 and 11 in conjunction with FIG. 3, an automatic transmission control system in accordance with another preferred embodiment of this invention is shown, which has the same mechanical structure as shown in FIG. 3.

In this embodiment, the automatic transmission control system has a feature of automatically selecting a power (P) mode and an economy (E) mode according to change ratios of engine output. As is shown in FIG. 10, for example, when there is a change in opening of the mechanical throttle valve 6, a change in throttle opening per unit of time TVO $(= \text{tvo}/\text{T})$ of the mechanical throttle valve 6 is calculated, which is recognized as a change ratio of output of the engine 3. Based on changes in throttle opening per unit of time TVO $(= \text{tvo}/\text{T})$, the shift modes, namely power (P) mode and an economy (E) mode, are automatically selected. In more detail, when a change in throttle opening per unit of time TVO of the mechanical throttle valve 6 is greater than a specified change value TVOo, the automatic transmission 1 is controlled to shift with the shift pattern for the power mode. On the other hand, when a change in throttle opening per unit of time TVO of the mechanical throttle valve 6 is less than the specified change value TVOo, the automatic transmission 1 is controlled to shift with the shift pattern for the economy mode.

The operation of the automatic transmission control system depicted in FIG. 10 is best understood with reference to FIG. 11, which is a flow chart illustrating an automatic transmission shift control routine or sequence for the central processing unit (CPU) 22 of the automatic transmission (AT) control unit 16.

Referring to FIG. 11, the first step at step S21 is to make a decision whether a current change in throttle opening per unit of time TVO of the mechanical throttle valve 6 is equal to or greater than the specified change value TVOo. If the answer to the decision is "YES," this indicates that the engine 3 operates in a power mode condition wherein the power mode is desired, then an opening MTVO of the mechanical throttle valve 6 is read from the throttle sensor 9 and stored temporarily in the memory 21 at step S22. Thereafter, a speed gear to which the automatic transmission 1 is shifted is selected corresponding to the opening MTVO following the shift pattern for the power mode at step S23 and then, appropriate shift solenoids are actuated so as to shift the automatic transmission 1 to the speed gear at step S24

Alternatively, if the answer to the decision at step S21 is "NO," this indicates that the engine 3 operates in an economy mode condition wherein the economy mode is desired, then, an opening ETVO of the electric throttle valve 8 is read from the throttle sensor 10 and stored temporarily in the memory 21 at step S25. The central processing unit (CPU) 22 then follows the shift pattern for the economy mode to select a speed gear corresponding to the opening ETVO at step S26 and then, actuates appropriate shift solenoids so as to shift the automatic transmission 1 to the speed gear at step S24, at which the speed shift control is accomplished.

With the automatic transmission control system of the present invention, since a shift pattern selection is automatically made on the basis of a change in throttle opening per unit of time TVO of the mechanical throttle valve 6, an appropriate shift of the automatic transmission is automatically performed in accordance with varying engine operating conditions. In this manner, while the high speed shift pattern is selected, if the accelerator pedal is depressed suddenly and deeply for a quick acceleration, the automatic transmission is shifted so as to obtain high engine output, with an increase in engine response. On the other hand, while the low speed shift pattern is selected, if engine output is not very large, a quick, deep depression of the accelerator pedal does not always provide high engine output. Instead, the automatic transmission is controlled to shift so as to maintain engine output at a current level, and driving will be accomplished with the most appropriate fuel consumption corresponding to the current engine output of the engine.

Since there are provided a primary mechanical throttle valve and a secondary electrically operated throttle valve which are controlled to open and close corresponding to an operated stroke of the mechanically linked accelerator pedal and engine output, respectively, the automatic transmission is shifted so as to obtain an increase in engine response when selecting the high speed shift pattern and when selecting the low speed shift pattern, so as to provide the most appropriate fuel consumption. Consequently, differing shift controls are implemented in conformity with the shift patterns, so that the automatic transmission can shift more suitably for engine operating conditions.

It is to be understood that although the present invention has been described in detail with respect to preferred embodiments thereof, various other embodiments and variants are possible to those skilled in the art, which fall within the scope and spirit of the invention, and such other embodiments and variants are intended to be covered by the following claims.

What is claimed is:

1. A shift control system for an automatic transmission connected to an engine in an automotive vehicle for shifting the automatic transmission in a first predetermined speed shift pattern which is selected when the vehicle runs at relatively higher speeds and a second predetermined speed shift pattern which is selected when the vehicle runs at relatively lower speeds, said shift control system comprising:

first throttle opening detecting means for providing a signal representing an operational movement of an accelerator pedal;

second throttle opening detecting means for providing a signal representing an actual throttle opening;

shift pattern selection means for selecting the first predetermined speed shift pattern and the second predetermined speed shift pattern; and shift control means for shifting the automatic transmission according to the signal representing the operational movement of the accelerator pedal provided by said fist throttle opening detecting means when said shift pattern selection means selects the first predetermined speed shift pattern and according to the signal representing the actual throttle opening provided by said second throttle opening detecting means when said shift pattern selection means selects the second predetermined speed shift pattern.

2. A shift control system as recited in claim 1, wherein said shift pattern selection means comprises a manually operated selection means for selecting the first predetermined high speed shift pattern and the second predetermined speed shift pattern.

3. A shift control system as recited in claim 2, wherein said first throttle opening detecting means comprises a throttle opening sensor for detecting an opening of a throttle valve which is operationally linked with the accelerator pedal.

4. A shift control system as recited in claim 3, wherein said shift pattern selection means detects a change rate in opening of the throttle valve based on openings of the throttle valve detected by said throttle opening sensor, and automatically selects the first predetermined speed shift pattern when detecting change rates in opening of the throttle valve higher than a predetermined change rate in opening of the throttle valve and the second predetermined speed shift pattern when detecting change rates in opening of the throttle valve lower than said predetermined change rate.

5. A shift control system as recited in claim 1 including means for setting the first predetermined speed shift pattern for a power operation mode of the engine and the second predetermined speed shift pattern for an economy operation mode of the engine.

6. A shift control system for an automatic transmission connected to an engine of an automotive vehicle for shifting the automatic transmission in a first predetermined speed shift pattern which is selected when the vehicle runs at higher speeds and a second predetermined speed shift pattern which is selected when the vehicle runs at lower speeds, said shift control system comprising:

a first throttle valve disposed in an intake passage of the engine;

a second throttle valve disposed upstream of said first throttle valve in the intake passage;

first throttle opening detecting means for detecting an opening of said first throttle valve;

second throttle opening detecting means for detecting an opening of said second throttle valve;

shift pattern selection means for selecting the first predetermined speed shift pattern and the second predetermined speed shift pattern; and shift control means for shifting the automatic transmission according to openings detected by said first throttle opening detecting means when said shift pattern selection means selects the first predetermined speed shift pattern and according to openings detected by said second throttle opening detecting means when said shift pattern selection means selects the second predetermined speed shift pattern.

7. A shift control system as recited in claim 6, wherein said first throttle valve is mechanically linked with an accelerator pedal so as to change its opening corresponding to movement of the accelerator pedal and said second throttle valve is electrically operated so as to change its opening according to at least an output of the engine.

8. A shift control system as recited in claim 7, wherein said shift pattern selection means comprises a manually operated selection means for selecting the first predetermined speed shift pattern and the second predetermined speed shift pattern.

9. A shift control system as recited in claim 7, wherein said shift pattern selection means detects a change rate in opening of at least one of the throttle valves based on openings of he throttle valve detected by one of sad first and second throttle opening detecting means, and automatically selects the first predetermined speed shift pattern when detecting change rates in opening of the throttle valve higher than a predetermined change rate in opening of the throttle valve and the second predetermined speed shift pattern when detecting change rates in opening of the throttle valve lower than said predetermined change rate.

10. A shift control system as recited in claim 7, which includes means for setting the first determined speed shift pattern for a power operation mode of the engine and the second predetermined speed shift pattern for an economy operation mode of the engine.

* * * * *